United States Patent [19]

Ring et al.

[11] 4,077,261

[45] Mar. 7, 1978

[54] INSTRUMENT PROTECTIVE APPARATUS

[76] Inventors: Sandiford Ring; John H. Ring, both of P.O. Box 14666, Houston, Tex. 77021

[21] Appl. No.: 786,969

[22] Filed: Apr. 13, 1977

[51] Int. Cl.² ................................................ G01L 7/08
[52] U.S. Cl. ........................................ 73/706; 73/716
[58] Field of Search ...................... 73/395, 392, 407 R

[56] References Cited

U.S. PATENT DOCUMENTS 1,868,018  7/1932  Miner .................................... 73/395

FOREIGN PATENT DOCUMENTS 688,097  2/1940  Germany .............................. 73/706

Primary Examiner—Donald O. Woodiel
Attorney, Agent, or Firm—Browning, Bushman & Zamecki

[57] ABSTRACT

Instrument protective apparatus comprising a body having first, second and third sections, the second section being disposed between the first and third. A first chamber is formed between the first and second sections and divided by a first diaphragm. A second chamber is formed between the second and third sections and divided by a second diaphragm. Fluid communication means are provided between the portions of the first and second chambers defined by the second section and the first and second diaphragms. The fluid communication means and communicating portions of the first and second chambers form a force transfer liquid reservoir substantially filled by a force transfer liquid. A pressure reaction fluid reservoir in the third section is at least partially defined by the portion of the second chamber defined by the third section and the second diaphragm and substantially filled with a pressure reaction fluid. Detector means associated with the force transfer liquid reservoir detect changes in the electrical characteristics within that reservoir.

20 Claims, 2 Drawing Figures

INSTRUMENT PROTECTIVE APPARATUS

BACKGROUND OF THE INVENTION

1. Field of the Invention

The present invention pertains to surge dampeners for use in connections with fluid conduits. In such conduits, it is frequently necessary or at least desirable to use various instruments such as pressure gauges, pH meters, conductivity probes, and flowmeters to monitor the conditions of the process fluid carried by the conduit. In many instances, however, such instruments are damaged, or at least rendered incapable of operating reliably, by the process fluid flowing through the conduit. For example, where the process fluid is being propelled by a reciprocating pump, or for numerous other reasons, the fluid flow may be characterized by pressure surges which cause extreme and/or rapid fluctuations of the instruments thereby precluding accurate readings. Such pressure surges may even damage the relatively delicate instruments. In still other instances, the process fluid itself may be harmful to the instruments, e.g., where the process fluid is an acid or other corrosive material. It is also frequently necessary to protect other apparatus such as pumps and lines from pressure surges, etc.

2. Description of the Prior Art

One method of dealing with these problems has been through the use of surge dampeners and similar protective devices. The device comprises a body having two compartments, one communicating with the process fluid conduit and the other closed and filled with either a pressurized gas or a liquid. The two compartments are separated by a flexible diaphragm.

Thus, if a pressure gauge is installed on the body of the surge dampening device in communication with the closed compartment and the compartment filled with liquid, pressure will be communicated from the conduit to the pressure gauge via the diaphragm and liquid. However, the diaphragm serves as a protective barrier between the process fluid and the pressure gauge in case the proces process is corrosive or otherwise harmful.

Where the fluid in the closed compartment of the surge dampening device is a compressive liquid, or more typically, gas, the device can be used to protect various instruments from the pressure surges. Specifically, if the surge dampening device is placed upstream of a flowmeter or other instrument in the fluid conduit, the diaphragm will expand into the closed compartment of the device when there is a pressure surge thus dampening the surge with respect to the downstream flowmeter. An instrument such as a pressure gauge communicating with the closed compartment is likewise protected.

Although such a device represents a considerable improvement in the fluid flow system, problems can still arise when the diaphragm leaks. If fluid leaks from the closed compartment, the dampening effect will be lessened. Furthermore, the nature of this fluid and the process fluid may be such that it is undesirable or hazardous to allow the two to mix in the conduit. Leakage in the other direction, i.e., from the conduit to the closed compartment, can expose the pressure gauge to any undesirable characteristics of the process fluid such as corrosiveness.

SUMMARY OF THE INVENTION

Instrument protective apparatus in accord with the present invention comprises a body having first, second and third sections, the second section being disposed between the first and third sections. A first chamber is formed between the first and second sections, and a first diaphragm disposed between these two sections divides the chamber into two portions. Similarly, a second chamber is formed between the second and third sections, and a second diaphragm disposed between these two sections divides the second chamber into two portions. The body also includes means providing fluid communication between the portions of the first and second chambers defined by the second section and the two diaphragms. The fluid communication means and the communicating portions of the chambers form a force transfer liquid reservoir substantially filled with a suitable force transfer liquid. A pressure reaction fluid reservoir in the third section of the body is at least partially defined by the portion of the second chamber defined by the third section of the body and the second diaphragm and is substantially filled with a pressure reaction fluid. Detector means are associated with the force transfer liquid reservoir for detecting changes in the electrical characteristics therein.

A pressure gauge may be connected to the body of the protective apparatus in communication with the pressure reaction fluid reservoir. The device is connected to a fluid flow conduit so that the portion of the first chamber defined by the first section of the body and the first diaphragm is in communication with the conduit. Thus, pressure within the fluid conduit can be communicated to the pressure gauge via the two diaphragms and interposed force transfer liquid and then through the pressure reaction fluid if the latter is a liquid. The gauge is protected from corrosiveness, radioactivity, etc. Alternatively, the pressure reaction fluid may be a gas whereby the gauge in the pressure reaction fluid reservoir and a downstream flowmeter or other instrument are protected from the pressure surges. However, if the force transfer liquid and the pressure reaction fluid are suitably chosen with respect to the process fluid, and each other, any leakage past either of the diaphragms into the force transfer liquid reservoir will cause a change of the electrical characteristics therein and will be detected by the detector means. The detector may be operative to activate visual and/or audible alarms to draw the condition to the attention of the operator or attendant before the leakage has progressed to the point of causing any serious damage or hazard.

Accordingly, it is a principal object of the present invention to provide instrument protective apparatus of the diaphragm type and including means for detecting diaphragm leaks.

Another object of the present invention is to provide an improved device for protecting instruments and other apparatus from pressure surges in a fluid flow conduit.

Still another object of the present invention is to provide an improved device for protecting an instrument from deleterious effect of the process fluid in a conduit.

Yet a further object of the invention is to provide an improved fluid flow system.

Still other objects, features, and advantages of the present invention will be made apparent by the follow-

DESCRIPTION OF THE PREFERRED EMBODIMENTS

Figure 1:
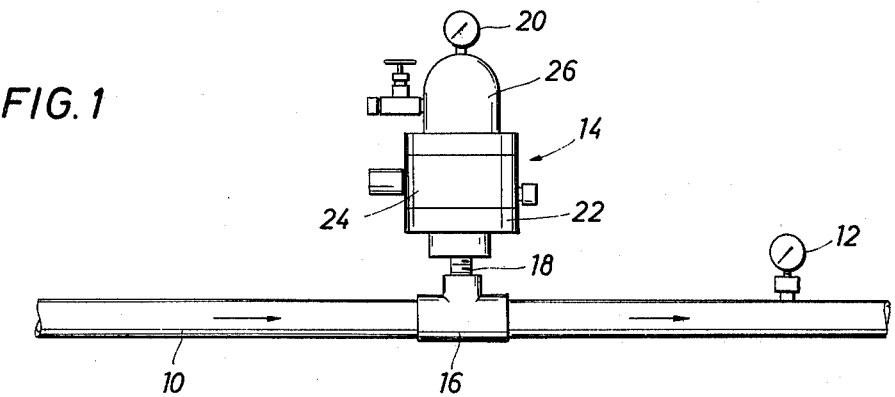
FIG. 1 is an elevation of a fluid flow system including a protective device according to the present invention.

Referring to FIG. 1 there is shown a fluid flow conduit 10 in which a process fluid, either liquid or gas, flows in the direction of the arrows. A flowmeter 12 of any well known type is installed in the conduit 10 as shown. An instrument protective device 14 is connected to the conduit 10 upstream of the flowmeter 12 by means of a fitting 16 and nipple 18. The device 14 is in pressure communication relation with the conduit 10 in a manner to be described more fully below. A pressure gauge 20 is installed in the device 14.

Figure 2:
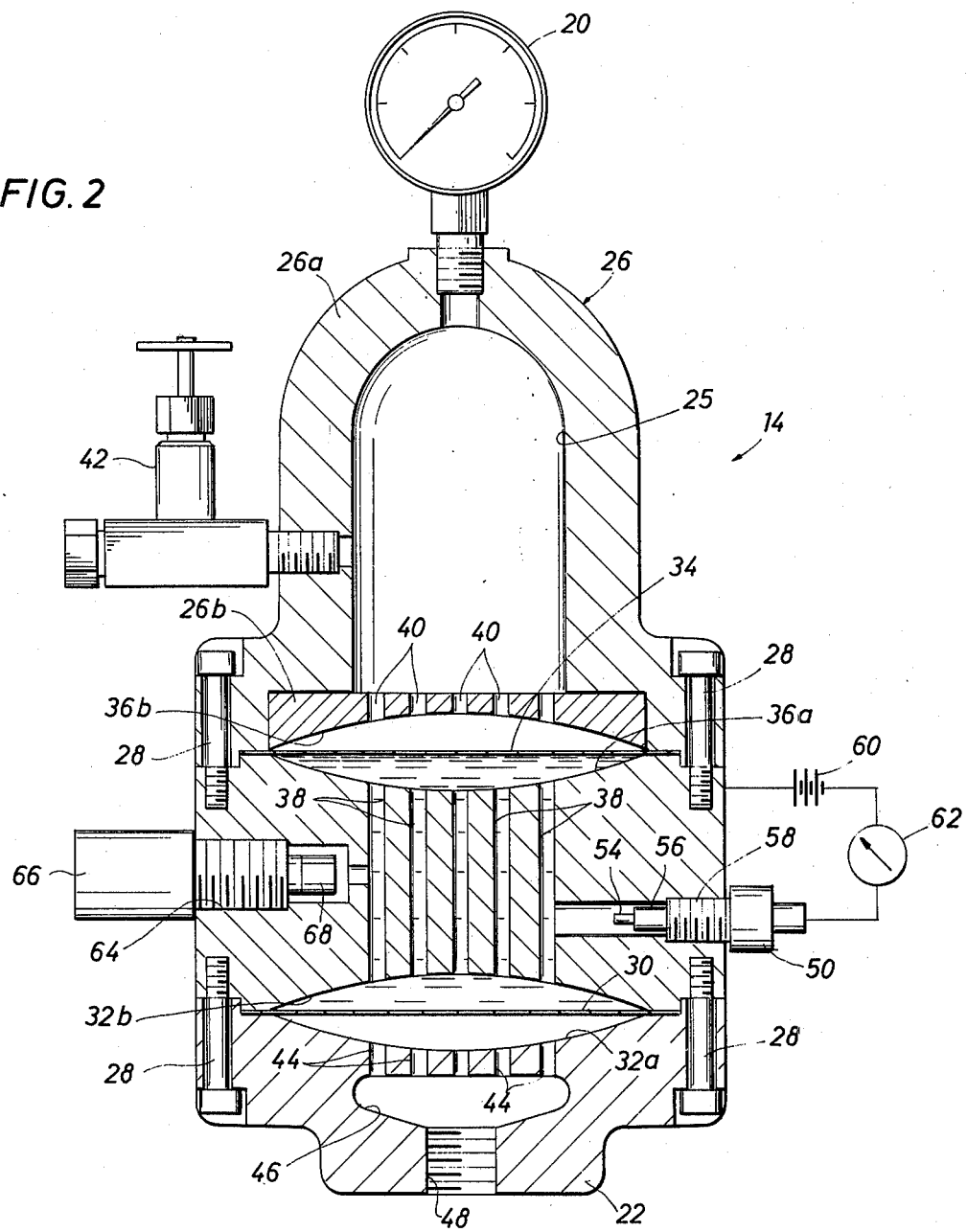
FIG. 2 is an enlarged longitudinal cross section of the protective device of FIG. 1.

Referring now to FIG. 2 in conjunction with FIG. 1, it can be seen that the device 14 comprises a body having first, second and third sections, 22, 24 and 26 respectively, section 24 being disposed between sections 22 and 26. In the embodiment shown, the sections 22, 24 and 26 are, for convenience, separable and are secured together by bolts 28, four of which are shown. However, it is noted that other arrangements are possible and that the use of the word "sections" herein refers to the different zones of the body which are not necessarily identical with the various parts into which the body may be physically divided.

A first diaphragm 30 is clamped between the sections 22 and 24 of the body. It can be seen that the opposed faces of the first and second body sections 22 and 24 have opposed symmetrical concavities therein whereby a first chamber is formed between the first and second body sections. It can also be seen that this first chamber is divided by diaphragm 30 into one portion 32a, defined by the first body section 22 and diaphragm 30, and another portion 32b defined by the second body section 24 and the diaphragm 30.

The opposed faces of second and third body sections 24 and 26 have similar concavities therein whereby a second chamber is formed between the second and third body sections. A second diaphragm 34 is clamped between sections 24 and 26 thereby dividing the second chamber into a portion 36a defined by the second section 24 and diaphragm 34, and another portion 36b defined by the third section 26 and diaphragm 34.

In many instances, the process fluid may contain radioactive material and it is necessary to protect the pressure reaction fluid reservoir from contamination thereby. Thus, the diaphragms 30 and 34 are preferably formed of inert polymeric materials, e.g., fluorocarbon resins such as Teflon, which are resistant to the corrosive nature of many radioactive compounds.

The concavities in the faces of the body sections which define the chambers receiving the diaphragms are sized and configured to permit the necessary anticipated movements of the diaphragms but to limit these movements within the elastic limits of the diaphragms so that the latter will not stretch in use.

A plurality of longitudinal bores 38 in second body section 24 provide fluid communication between portion 32b of the first chamber and portion 36a of the second chamber. Together, the bores 38 and the chamber portions 32b and 36a form a force transfer liquid reservoir substantially filled with a force transfer liquid to be described more fully below.

The third body section 26 comprises two parts, a generally bell shaped hollow part 26a forming a receptacle 25, and a disc-like part 26b installed generally across the mouth of the hollow part 26a and secured in any suitable manner. Part 26b forms the end face which partially defines the portion 36b of the second chamber. A plurality of longitudinal bores 40 through part 26b provide communication between chamber portion 36b and receptacle 25. Together, the chamber portion 36b, the bores 40 and the receptacle 25 form a pressure reaction fluid reservoir in the third body section 26, and this reservoir is substantially filled with a pressure reaction fluid. As described more fully below, the pressure reaction fluid "reacts" to the pressure in conduit 10 either by transmitting it to the gauge 20 (where the fluid is a liquid) or by compression and absorption of the pressure surges (where the fluid is a gas).

A nozzle and valve assembly 42 communicates with the interior of part 26a for admitting fluid or to removing fluid from the pressure reaction fluid reservoir. The gauge 20 is operatively connected to part 26a in communication with the pressure reaction fluid reservoir as shown.

The first body section 22 has a plurality of bores 44 communication with chamber portion 32a and extending away from the chamber portion to a compartment 46. A bore 48 communicating with compartment 46 is threaded to receive the nipple 18. Process fluid is thereby permitted to communicate with chamber portion 32a.

Thus where the pressure reaction fluid is a liquid, pressure changes in the process fluid in conduit 10 are communicated via diaphragm 30, the force transfer liquid, diaphragm 34, and the pressure reaction fluid to gauge 20. However, intermingling of the pressure reaction fluid and the process fluid is prevented by the interposition of the diaphragms 30 and 34.

Alternatively, the pressure reaction fluid reservoir 36b, 40, 25 may be filled with a gas at a suitable pressure determined by the gauge 20. Then, upon a pressure surge in the conduit 10, the diaphragms 30 and 34 will be permitted to expand away from the conduit 10 and toward the compartment 25 so tht the protective device can receive the surging fluid and the flowmeter 12 and gauge 20 are protected from the surges. The device still serves to protect the gauge 20 from any deleterious chemical characteristics of the process fluid.

It will be appreciated that if one or both of the diaphragms 30 and 34 should develop leaks, the effectiveness of the device in dampening pressure surges as well as in preventing intermingling of the process and pressure reaction fluids will be lessened. It will be understood that such intermingling should be prevented, not only to protect the gauge 20 from any deleterious effects of the process fluid, but also to prevent contamination of the pressure reaction fluid by the process fluid. The latter is especially true where the contamination in question includes radioactive matter. Accordingly leak detector means are provided which are capable of detecting changes in the electrical characteristics of the fluid within the force transfer liquid receptacle 32b, 38, 36a. As used herein, the term "electrical characteristics" is used to encompass electromagnetic characteristics as well.

One such means includes a conductivity probe assembly 50 threaded into a bore 52 in second body section 24. Bore 52 is in open communication with the force transfer liquid reservoir via at least one of the bores 38. Probe assembly 50 has electrodes 54 and 56 electrically insulated from each other. Electrode 56 is electrically connected to the threaded portion 58 of probe 50 and thus to body section 24. A battery 60 has one terminal connected to body section 24 and the other terminal connected to electrode 54 through ammeter 62. For current to flow through ammeter 26 from battery 60, there must be conductance between electrodes 54 and 56. Thus the current drain on battery 60 will be proportional to the conductivity of the fluid within the force transfer liquid reservoir. By suitably choosing the force transfer liquid and the pressure reaction fluid so that the conductivity of the force transfer liquid differs substantially from those of the other two fluids, leaks can be detected by observing changes in the ammeter 62. Ammeter 62 may include means for producing visual and-/or audible signals.

Although the force transfer liquid may have a conductivity either greater than or less than those of the other two fluids, it is convenient, where the process fluid is conductive, to choose a force transfer liquid with negligible conductivity and a pressure reaction fluid of significant conductivity. Thus, where no leakage is occurring, no current will flow through the circuit of the probe 50. The presence of leakage will be accompanied by the flow of current and this current may be used to activate the alarm.

The second body section 24 also has a bore 64 into which is threaded a conventional electronic dielectric strength detector 66 having a suitable probe 68. Bore 64 is in open communication with the force transfer liquid reservoir so that the probe 68 is exposed to the fluid therein. The detector 66 is capable of producing an electric signal indicative of the dielectric constant of the fluid within the fluid transfer liquid reservoir in a manner well known in the art. Thus for example, assuming that the force transfer liquid were a material having a relatively high dielectric constant and the pressure reaction fluid and/or process fluid were materials having relatively low dielectric constants, a leakage through diaphragm 34 and/or diaphragm 30 would be rapidly detected. Although detectors such as 66 are often designed to detect decreases in the dielectric constant of a fluid, they may also be designed to detect similar increases. As in the case of the conductivity probe, dielectric strength detector 66 could be suitably connected to an audible or visual alarm.

It will be apparent that by proper selection of the force transfer liquid and the pressure reaction fluid together with a knowledge of the electrical characteristics of the process fluid, numerous embodiments of the present invention can be easily devised. For example, assume that the force transfer liquid is one of high dielectric constant such as for example polytetrafluoroethylene liquid, silicone oil or the like and the process fluid is a gas or liquid of a dielectric constant lower than that of the transfer liquid. Let it further be assumed that the pressure reaction fluid is an oil such as a lubricating oil or other aliphatic hydrocarbon oil, which has a lower dielectric constant than the force transfer liquid. Now, should diaphragm 34 break, pressure reaction fluid and force transfer liquid would be mixed resulting in a medium in the force transfer liquid reservoir having a lower dielectric constant than force transfer liquid. This change will be detected by dielectric detector 66 which, as noted, can be designed so as to throw a switch to activate a visual or audio warning signal. Likewise, should diaphragm 30 break, process fluid will be mixed with the force transfer liquid again resulting in a lowering of the dielectric constant of the medium in the force transfer fluid reservoir with the result as described immediately above.

In another case, the force transfer liquid can be chosen to have a high dielectric constant and low conductivity, e.g., an aliphatic hydrocarbon oil, and the pressure reaction fluid could be a material such as polyethylene glycol which is non-miscible with and has a higer specific gravity than the force transfer liquid and in addition has a much higher conductivity. If conductivity probe 50 or an extension thereof is disposed so as to be toward the bottom of second body section 24 such that any polyethylene glycol which escapes through diaphragm 34 will collect near the probe's electrodes such will immediately be detected as increased conductivity within the force transfer liquid reservoir. Obviously, if the pressure reaction fluid is of higher conductivity but is miscible with the force transfer liquid, location of probe 50 in a lower portion of section 24 is not necessary since the conductivity of the fluid in the force transfer liquid reservoir will be generally uniformly increased throughout.

In still another case, the force transfer liquid could have a conductivity intermediate that of the pressure reaction fluid and the process fluid. In this event, if one of the diaphragms were leaking, such could be determined by an increase or a decrease in the conductivity of the medium in the force transfer liquid reservoir, depending on whether the pressure reaction fluid or the process fluid were intermixing with the force transfer liquid.

It will also be apparent that by proper selection of the pressure reaction fluid and the force transfer liquid, a well as by knowing the electrical characteristics of the process fluid a simultaneous reading of the dielectric strength and conductivity can be utilized. Such an embodiment is especially useful where it is desired to determine which of the two diaphragms is leaking or whether both are leaking. Thus the fluid could be chosen so that one variable, e.g., the dielectric constant, would be primarily indicative of leakage in one diaphragm and the other variable, conductivity, would be primarily indicative of leakage in the other diaphragm. Then substantial changes in both variables would indicate leakage in both diaphragms.

It will also be apparent that in a case where the respective liquids and fluids described above are immiscible and having varying specific gravities, the detection means, i.e., the dielectric constant detector and/or the conductivity probe, as seen above, can be positioned in body section 24 to take such into account.

While emphasis has been placed above on the ability to detect leakage in one of the diaphragms used in the protective device, it is to be understood that the invention is not so limited. Any condition which results in a change in the electrical characteristics within the force transfer liquid receptacle can be detected. For example, it is conceivable that body section 24 itself may become cracked resulting in the loss of force transfer liquid. Such a condition, as noted above, could be detected by proper positioning of the detector used to determine changes in the electrical characteristics of the force transfer fluid path.

It is to be understood that techniques other than measurement of dielectric strength and/or conductivity such as for example oscillometry, measurement of paramagnetism, nuclear magnetic resonance and other similar techniques may also be employed, the two techniques described above in detail being particularly desirable because of their simplicity and requirements of relatively inexpensive equipment. Furthermore, while the preferred embodiment described above utilizes detectors of two different types, either type may be used individually in other embodiments. Various other changes may be made without departing from the spirit of the invention. In particular, the protective device of the invention may be used to protect various other types of instruments such as pH meters, as well as other types of apparatus such as pumps, from pressure surges. It can also be used to protect the types of instruments shown in the embodiment illustrated, but with these instruments disposed in other positions in the system. For example, it could be used to protect a pressure gauge located downstream of the device rather than in the device itself. Accordingly, it is intended that the scope of the invention be limited only by the claims which follow.

We claim:

1. Protective apparatus comprising:
   a body having first, second and third sections, said second section being disposed between said first and third sections;
   a first chamber formed between said first and second sections;
   a second chamber formed between said second and third sections;
   a first diaphragm member disposed between said first and second sections and dividing said first chamber;
   a second diaphragm member disposed between said second and third sections and dividing said second chamber;
   means providing fluid communication between portions of said first and second chambers defined by said second section and said first and second diaphragm members, said fluid communication means and said communicating portions of said first and second chambers forming a force transfer liquid reservoir;
   a pressure reaction fluid reservoir in said third section of said body at least partially defined by the portion of said second chamber defined by said third section and said second diaphragm member;
   a pressure reaction fluid substantially filling said pressure reaction fluid reservoir;
   a force transfer liquid substantially filling said force transfer liquid reservoir;
   and detector means associated with said force transfer liquid reservoir for detecting changes in the electrical characteristics within said reservoir.

2. The apparatus of claim 1 wherein said pressure reaction fluid comprises a pressurized gas.

3. The apparatus of claim 1 wherein said pressure reaction fluid comprises a liquid.

4. The apparatus of claim 1 wherein said detector means comprises means for detecting changes in the dielectric constant of fluid within said force transfer liquid reservoir.

5. The apparatus of claim 4 wherein said force transfer liquid has a dielectric constant substantially greater than the dielectric constant of said pressure reaction fluid.

6. The apparatus of claim 4 wherein said force transfer liquid has a dielectric constant substantially less than the dielectric constant of said pressure reaction fluid.

7. The apparatus of claim 1 wherein said detector means comprises means for detecting changes in the conductivity of fluid within said force transfer liquid reservoir.

8. The apparatus of claim 7 wherein the conductivity of said force transfer liquid is substantially less than the conductivity of said pressure reaction fluid.

9. The apparatus of claim 7 wherein the conductivity of said force transfer liquid is substantially greater than the conductivity of said pressure reaction fluid.

10. The apparatus of claim 1 wherein said detector means comprises means for detecting changes in the dielectric constant of fluid within said force transfer liquid reservoir and means for detecting changes in the conductivity of fluid within said force transfer liquid reservoir.

11. A fluid flow system comprising:
    a fluid conduit;
    a process fluid flowing through said conduit;
    a protective device connected to said conduit and comprising:
    a body having first, second and third sections, said second section being disposed beween said first and third sections;
    a first chamber formed between said first and second sections;
    a second chamber formed between said second and third sections;
    a first diaphragm member disposed between said first and second sections and dividing said first chamber, the portion of said first chamber defined by said first section and said first diaphragm being in pressure communication with said conduit;
    a second diaphragm member disposed between said second and third sections and dividing said second chamber;
    means providing fluid communication between portions of said first and second chambers defined by said second section and said first and second diaphragm members, said fluid communication means and said communicating portions of said first and second chambers forming a force transfer liquid reservoir;
    a pressure reaction fluid reservoir in said third section of said body at least partially defined by the portion of said second chamber defined by said third section and said second diaphragm means;
    a pressure reaction fluid substantially filling said pressure reaction fluid reservoir;
    a force transfer liquid substantially filling said force transfer liquid reservoir;
    and detector means associated with said force transfer liquid reservoir for detecting changes in the electrical characteristics within said force transfer liquid reservoir.

12. The system of claim 11 further comprising a pressure sensing means associated with said body for sensing the pressure within said pressure reaction fluid reservoir.

13. The system of claim 12 wherein said pressure reaction fluid is a liquid.

14. The system of claim 11 further comprising a flowmeter means for sensing the rate of flow of said process fluid downstream of said protective device.

15. The system of claim 14 wherein said pressure reaction fluid is a gas.

16. The system of claim 11 wherein said detector means comprises means for detecting changes in the dielectric constant of fluid within said force transfer liquid reservoir.

17. The system of claim 16 wherein said force transfer liquid has a dielectric constant substantially greater than the dielectric constants of said pressure reaction fluid and said process fluid.

18. The system of claim 11 wherein said detector means comprises means for detecting changes in the conductivity of fluid within said force transfer liquid reservoir.

19. The system of claim 18 wherein said force transfer liquid has a conductivity intermediate the conductivities of said pressure reaction fluid and said process fluid.

20. The system of claim 11 wherein said detector means comprises means for detecting changes in the dielectric constant of fluid within said force transfer liquid reservoir and means for detecting changes in the conductivity of fluid within said force transfer liquid reservoir.

* * * * *